US009927250B2

(12) United States Patent
Chen et al.

(10) Patent No.: US 9,927,250 B2
(45) Date of Patent: Mar. 27, 2018

(54) DYNAMIC DETERMINATION OF MEET LOCATION

(71) Applicant: International Business Machines Corporation, Armonk, NY (US)

(72) Inventors: Nan Chen, Beijing (CN); Si Bin Fan, Beijing (CN); Ju Ling Liu, Beijing (CN); Yi Cen Pan, Beijing (CN); Li Na Wang, Beijing (CN); Juan Y. Zhai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/924,951

(22) Filed: Oct. 28, 2015

(65) Prior Publication Data

US 2017/0122756 A1   May 4, 2017

(51) Int. Cl.
*G01C 21/34* (2006.01)
(52) U.S. Cl.
CPC ..... *G01C 21/3438* (2013.01); *G01C 21/3484* (2013.01); *G01C 21/3492* (2013.01)
(58) Field of Classification Search
CPC .......................... G01C 21/3438; G01C 21/3492
USPC ......................................................... 701/482
See application file for complete search history.

(56) References Cited

U.S. PATENT DOCUMENTS

| | | | | |
|---|---|---|---|---|
| 9,679,322 B2 * | 6/2017 | Horstemeyer | ..... | G06Q 30/0609 |
| 2006/0149464 A1 * | 7/2006 | Chien | ................ | G01C 21/3492 |
| | | | | 701/533 |
| 2008/0231507 A1 | 9/2008 | Burckart et al. | | |
| 2009/0017803 A1 | 1/2009 | Brillhart et al. | | |
| 2009/0100037 A1 * | 4/2009 | Scheibe | ............... | G06F 17/3087 |
| 2011/0113148 A1 * | 5/2011 | Salmela | ............. | G01C 21/3438 |
| | | | | 709/229 |
| 2013/0080204 A1 | 3/2013 | Khorashadi et al. | | |
| 2013/0204525 A1 * | 8/2013 | Pfeifle | ................ | G08G 1/09626 |
| | | | | 701/533 |
| 2014/0207373 A1 * | 7/2014 | Lerenc | ............... | G01C 21/3438 |
| | | | | 701/465 |
| 2014/0207375 A1 * | 7/2014 | Lerenc | .................... | H04W 4/02 |
| | | | | 701/527 |
| 2014/0222328 A1 * | 8/2014 | Baca | ........................ | H04W 4/02 |
| | | | | 701/410 |
| 2014/0343841 A1 * | 11/2014 | Faaborg | ............. | G01C 21/3438 |
| | | | | 701/465 |
| 2015/0081212 A1 * | 3/2015 | Mitchell | .............. | G01C 21/367 |
| | | | | 701/454 |
| 2016/0275458 A1 * | 9/2016 | Meushar | .............. | G06Q 10/109 |

* cited by examiner

FOREIGN PATENT DOCUMENTS

WO      2012148556 A2    11/2012

OTHER PUBLICATIONS

Krumm, John, "Real Time Destination Prediction Based on Efficient Routes", Paper No. 2000-01-0811, Copyright © 2006 SAE International, Microsoft Research, 6 pages, Printed Sep. 10, 2015.

*Primary Examiner* — Yazan A Soofi
(74) *Attorney, Agent, or Firm* — Lance I. Hochhauser; Aaron N. Pontikos

(57) ABSTRACT

Determination of a dynamic meet location for multiple individuals using current conditions. Taking into account a variety of external conditions (including traffic, travel speed, etc.), a meet location is selected and dynamically updated for multiple individuals based, at least in part, on a set of initial conditions.

17 Claims, 3 Drawing Sheets

DYNAMIC DETERMINATION OF MEET LOCATION

BACKGROUND

The present invention relates generally to the field of data processing, and more particularly to navigation including route searching or determination.

Individuals use a variety of technology to determine meet locations for less formal social interactions. For example, friends looking to meet on a city street before a concert must coordinate a meet location. The friends can set a meet location over email, instant messaging, text messaging, phone calls, or other communication methods. However, the meet location may be less convenient for some individuals, as opposed to others. Additionally, as individuals near the meet location, circumstances for each of the individuals can change. For example, one of the friends can get caught in traffic.

SUMMARY

According to an aspect of the present invention, there is a method that performs the following operations (not necessarily in the following order): (i) determining a meet location for a set of members; (ii) determining an updated set of locations corresponding to the set of members; and (iii) updating the meet location for the set of members. A meet location is based, at least in part, on a set of locations corresponding to a set of members. Determining the updated set of locations corresponding to the set of members is performed by computer software running on computer hardware.

According to an aspect of the present invention, there is a computer program product comprising a computer readable storage medium on which is stored the following instructions (not necessarily in the following order): (i) instructions executable by a device to cause the device to determine a meet location for a set of members; (ii) instructions executable by a device to cause the device to determine an updated set of locations corresponding to the set of members; and (iii) instructions executable by a device to cause the device to update the meet location for the set of members. A meet location is based, at least in part, on a set of locations corresponding to a set of members.

According to an aspect of the present invention, there is a computer system comprising a processor set and a computer readable storage medium. The processor set is structured, located, connected, and/or programmed to execute instructions stored on the computer readable storage medium and the instructions include the following (not necessarily in the following order): (i) instructions executable by a device to cause the device to determine a meet location for a set of members; (ii) instructions executable by a device to cause the device to determine an updated set of locations corresponding to the set of members; and (iii) instructions executable by a device to cause the device to update the meet location for the set of members. A meet location is based, at least in part, on a set of locations corresponding to a set of members.

DETAILED DESCRIPTION

Determination of a dynamic meet location for multiple individuals using current conditions. Taking into account a variety of external conditions (including traffic, travel speed, etc.), a meet location is selected and dynamically updated for multiple individuals based, at least in part, on a set of initial conditions.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
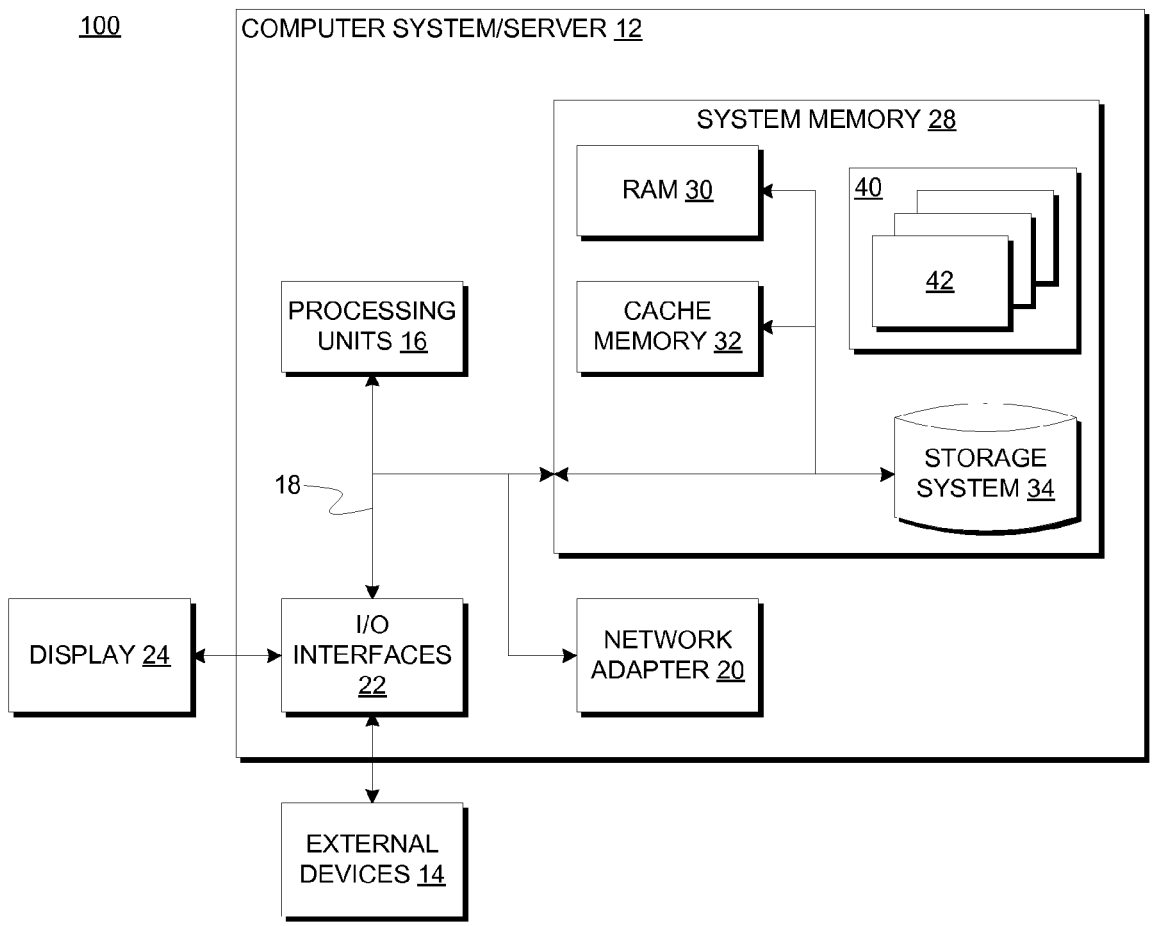
FIG. 1 is a block diagram view of a first embodiment of a system according to the present invention.

Referring now to FIG. 1, which is depicts a block diagram of computing device navigation environment 100. Computing device navigation environment 100 contains computer system/server 12, which is operational with numerous other general purpose or special purpose computing system environments or configurations. Examples of well-known computing systems, environments, and/or configurations that may be suitable for use with computer system/server 12 include, but are not limited to: personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 1, computer system/server 12 is shown in the form of a general-purpose computing device. The components of computer system/server 12 may include, but are not limited to: processing units 16; a system memory 28; and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (i.e., at least one) of program modules that are configured to carry out the functions of embodiments of the invention.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the invention as described herein.

Computer system/server 12 may also communicate with external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In some embodiments of the present invention, computer system/server 12 communicates with a variety of mobile computing devices. In some embodiments of the present invention, computer system/server communicates with a mobile computing device using a wireless network. Alternatively, computer system/server 12 communicates with a mobile computing device using a communication protocol including, but not limited to: (i) a radio frequency (RF) protocol; (ii) an infrared (IR) protocol; (iii) a near field communication (NFC) protocol; and/or (iv) any one or more wireless communication protocols.

Figure 2:
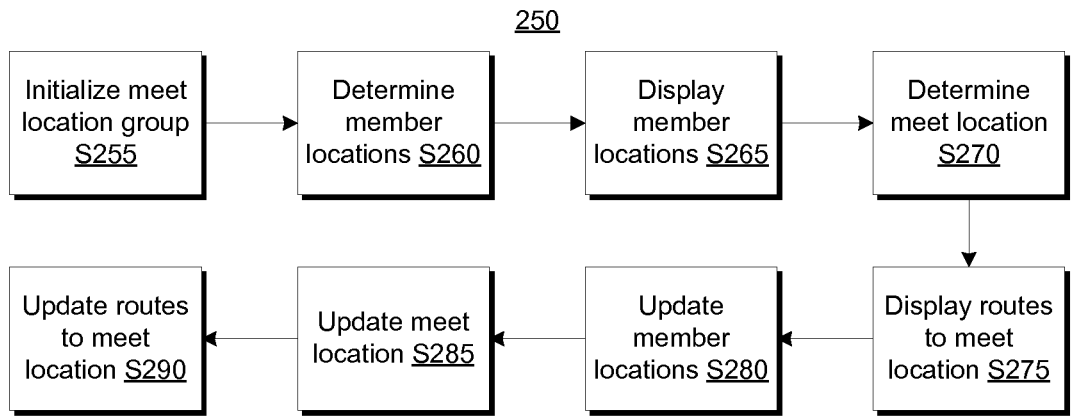
FIG. 2 is a flowchart showing a first embodiment method performed, at least in part, by the first embodiment system.
Figure 3:
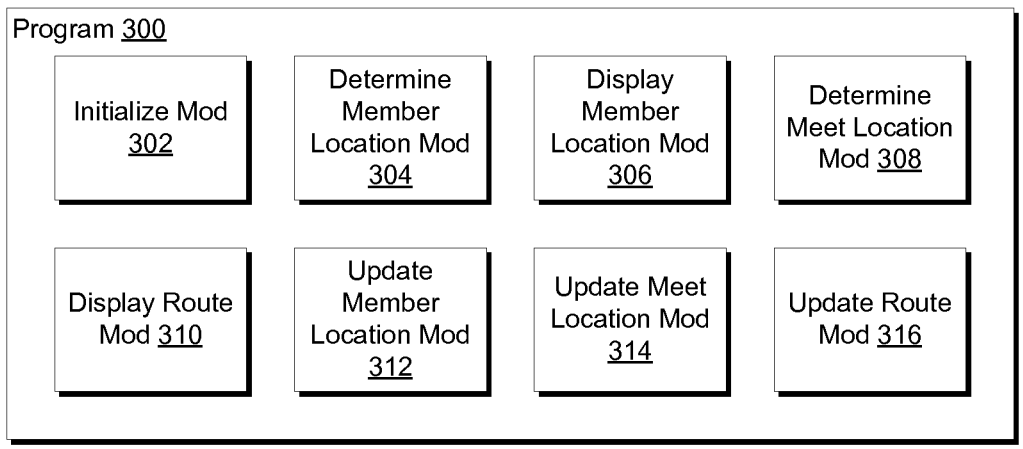
FIG. 3 is a block diagram view of a machine logic (e.g., software) portion of the first embodiment system.

FIG. 2 shows flowchart 250 depicting a method according to the present invention. FIG. 3 shows program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, Ann is meeting her two friends, Betty and Chris, after work then heading to a coffee shop.

Processing begins at operation S255, where initialize mod 302 initializes a meet location group. Initialize mod 302 initializes a meet location group that allows communication among mobile computing devices for a variety of individuals. In this example, initialize mod 302 initializes a meet location group among Ann, Betty, and Chris. In some embodiments of the present invention, initialize mod 302 retrieves a previously created meet location group. In some embodiments of the present invention, initialize mod 302 retrieves a previously created meet location group and modifies the previously created meet location group to contain a new set of individuals.

Processing proceeds to operation S260, where determine member location mod 304 determines a set of member locations corresponding to a set of members of a meet location group. A member location is sometimes also called a geographic location. In this example, determine member location mod 304 uses a global positioning system (GPS) to determine a set of member locations corresponding to Ann, Betty, and Chris. Determine member location mod 304 correlates a set of member locations to a map. In some embodiments of the present invention, determine member location mod 304 uses triangulation to determine a set of member locations. Alternatively, determine member location mod 304 use various means of locating a member including, but not limited to: (i) cell phone signal triangulation; (ii) wireless network triangulation; (iii) receiving a location as an input; and/or (iv) a combination of locating means.

Processing proceeds to operation S265, where display member location mod 306 displays a set of member locations. In this example, display member location mod 306 displays to Ann a map including the locations of Ann, Betty, and Chris. In some embodiments of the present invention, display member location mod 306 displays a set of member locations on a map. In some embodiments of the present invention, display member location mod 306 displays a set of member locations in a scale environment. Alternatively, display member location mod 306 displays a set of member locations in a not-to-scale environment. For example, display member location mod 306 can display a set of member locations on a map produced by a transit authority (e.g., a subway map) that is not drawn to scale.

Processing proceeds to operation S270, where determine meet location mod 308 determines a meet location. A meet location is sometimes also called a first meet location. Determine meet location mod 308 determines a meet location based, at least in part, on a set of member locations. In some embodiments of the present invention, determine meet location mod 308 determines a meet location based on a set of additional factors including, but not limited to: (i) a set of rates of travel corresponding to the set of members; (ii) a set of travel methods corresponding to the set of members; (iii) a set of input conditions; and/or (iv) a set of external conditions. In some embodiments of the present invention, determine meet location mod 308 incorporates a set of factors to determine a meet location including, but not limited to: (i) a shortest amount of time (e.g., a net time across a set of members); (ii) a shortest amount of distance (e.g., a net distance across a set of members); (iii) a shortest mean time (e.g., an average time across a set of members); (iv) a shortest mean distance (e.g., an average distance across a set of members); (v) a set of members arriving at a meet location at one time (e.g., incorporating time, speed, and distance corresponding to each member); (vi) social media (e.g., using social media to determine a meet location, such as a familiar location or a review and/or rating website); and/or (vii) a combination of factors. In some embodiments of the present invention, a set of input conditions includes, but is not limited to: (i) a type of meet location (e.g., a coffee shop); (ii) a future destination (e.g., a concert venue); and/or (iii) a set of preferences (e.g., specific brand preferences). In some embodiments of the present invention, a set of external conditions includes, but is not limited to: (i) weather conditions; (ii) traffic conditions; (iii) ongoing construction; and/or (iv) special events (e.g., an outdoor concert). In some embodiments of the present invention, determine meet location mod 308 predicts a future rate of speed for a set of members. In some embodiments of the present invention, determine meet location mod 308 determines a meet location based, at least in part, on a predicted future rate of speed for a set of members. In this example, determine meet location mod 308 determines a meet location for Ann, Betty, and Chris on a street corner near a coffee shop.

In some embodiments of the present invention, determine meet location mod 308 uses an algorithm to determine a meet location. In some embodiments of the present invention, determine meet location mod 308 determines a smallest radius within which are the current locations of each member. In some embodiments of the present invention, determine meet location mod 308 determines a meet location contained in a smallest radius within which are the current locations of each member based, at least in part, on a set of factors. In some embodiments of the present invention, determine meet location mod 308 uses Expression (1), Expression (1), and Expression (3) to determine a meet location.

$$\text{MeetDuration(point } i) = \text{maximum(distance } A_i/\text{speed } A, \ldots, \text{distance } X_i/\text{speed } X) \quad (1)$$

$$\text{MinMeetDuration(path } k) = \text{minimum(MeetDuration (point 1)}, \ldots, \text{MeetDuration (point } i), \ldots, \text{MeetDuration(point } j)) \quad (2)$$

$$\text{MeetLocation} = \text{Location(minimum(MinMeetDuration (path 1)}, \ldots, \text{MinMeetDuration (path } k), \ldots, \text{MinMeetDuration(path } n))) \quad (3)$$

Expression (1) determines a longest duration for a set of members to reach a point (sometimes called a limiting member time). In Expression (1): point i represents a location; A through X represent a set of members; distance $A_i$ represents a current distance between member A and point i; speed A represents a current rate of travel for member A; and MeetDuration (point i) represents the longest amount of time a member will take to reach point i. Expression (2) determines a point having the lowest limiting member time. In Expression (2): path k is a path within an area; point 1 through point j (including point i) represent a set of potential meet locations along path k; and MinMeetDuration (path k) determines a point along path k having a lowest MeetDuration. Expression (3) determines a meet location. In Expression (3): path 1 through path n (including path k) are a set of paths within an area; Location is a function that determines a location associated with a MinMeetDuration and a path; and MeetLocation is a meet location for a set of members.

An alternative to Expression (1) is Expression (1').

$$\text{MeetDuration(point } i) = \text{average(distance } A_i/\text{speed } A, \ldots, \text{distance } X_i/\text{speed } X) \quad (1')$$

Expression (1') determines an average duration for a set of members to reach a point. Expression (2) then determines a point having a lowest average time. Expression (3) then determines a meet location.

In some embodiments of the present invention, determine meet location mod 308 uses an algorithm to determine a meet location. In some embodiments of the present invention, determine meet location mod 308 determines a smallest radius within which are the current locations of each member. In some embodiments of the present invention, determine meet location mod 308 determines a meet location contained in a smallest radius within which are the current locations of each member based, at least in part, on a set of factors. In some embodiments of the present invention, determine meet location mod 308 uses Expression (4), Expression (5), and Expression (6) to determine a meet location.

$$\text{MeetDistance(point } i) = \text{sum(distance } A_i, \ldots, \text{distance } X_i) \quad (4)$$

$$\text{MinMeetDistance(path } k) = \text{minimum(MeetDistance (point 1)}, \ldots, \text{MeetDistance (point } i), \ldots, \text{MeetDistance(point } j)) \quad (5)$$

$$\text{MeetLocation} = \text{Location(minimum(MinMeetDistance (path 1)}, \ldots, \text{MinMeetDistance (path } k), \ldots, \text{MinMeetDistance(path } n))) \quad (6)$$

Expression (4) determines a total distance for a set of members to reach a point. In Expression (4): point i represents a location; A through X represent a set of members; distance $A_i$ represents a current distance between member A and point i; and MeetDistance (point i) represents the total distance for a set of members to reach point i. Expression (5) determines a point having the lowest total distance for a set of members. In Expression (5): path k is a path within an area; point 1 through point j (including point i) represent a set of potential meet locations along path k; and MinMeetDistance (path k) determines a point along path k having a lowest MeetDistance. Expression (6) determines a meet location. In Expression (6): path 1 through path n (including path k) are a set of paths within an area; Location is a function that determines a location associated with a MinMeetDistance and a path; and MeetLocation is a meet location for a set of members.

An alternative to Expression (4) is Expression (4').

$$\text{MeetDistance(point } i) = \text{average(distance } A_i, \ldots, \text{distance } X_i) \quad (4')$$

Expression (4') determines an average distance for a set of members to reach a point. Expression (5) then determines a point having a lowest average distance for a set of members. Expression (6) then determines a meet location.

Processing proceeds to operations S275, where display route mod 310 displays a set of routes to a meet location. In this example, display route mod 310 displays to Ann a map including the routes for Ann, Betty, and Chris to reach the meet location. In some embodiments of the present invention, display route mod 310 displays a set of routes to a meet location on a map. In some embodiments of the present invention, display route mod 310 displays a set of routes in a scale environment. Alternatively, display route mod 310 displays a set of routes in a not-to-scale environment. For example, display route mod 310 can display a set of routes on a map produced by a transit authority (e.g., a subway map) that is not drawn to scale. In some embodiments of the present invention, a route corresponding to a member starts at a member location and terminates at a meet location.

Processing proceeds to operation S280, where update member location mod 312 updates a set of member locations. In this example, update member location mod 312 uses a global positioning system (GPS) to update a set of member locations corresponding to Ann, Betty, and Chris. Update member location mod 312 correlates a set of member locations to a map. In some embodiments of the present invention, update member location mod 312 uses triangulation to update a set of member locations. Alternatively, update member location mod 312 use various means of locating a member including, but not limited to: (i) cell phone signal triangulation; (ii) wireless network triangulation; (iii) receiving a location as an input; and/or (iv) a combination of locating means. In some embodiments of the present invention, update member location mod 312 updates a set of member locations in real time. In some embodiments of the present invention, update member location mod 312 updates a set of member locations in a dynamic manner. In some embodiments of the present invention, update member location mod 312 updates a set of member locations in a periodic manner. In some embodiments of the present invention, update member location mod 312 updates a set of member locations based on a set of conditions. In some embodiments of the present invention, update member location mod 312 updates a set of member locations based on a set of conditions including, but not limited to: (i) a preset time period; (ii) a preset distance traveled; (iii) an input from a member; (iv) a change in rate of travel; and/or (v) a member deviates from a route.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

Processing proceeds to operation S285, where update meet location mod 314 updates a meet location. Updating a meet location is sometimes also called generating a second meet location. An updated meet location is sometimes also called a second meet location. Update meet location mod 314 updates a meet location based, at least in part, on a set of member locations. In some embodiments of the present invention, update meet location mod 314 updates a meet location based on a set of additional factors including, but not limited to: (i) a set of rates of travel corresponding to the set of members; (ii) a set of travel methods corresponding to the set of members; (iii) a set of input conditions; and/or (iv) a set of external conditions. In some embodiments of the present invention, update meet location mod 314 incorporates a set of factors to determine a meet location including, but not limited to: (i) a shortest amount of time (e.g., a net time across a set of members); (ii) a shortest amount of distance (e.g., a net distance across a set of members); (iii) a shortest mean time (e.g., an average time across a set of members); (iv) a shortest mean distance (e.g., an average distance across a set of members); (v) a set of members arriving at a meet location at the same time (e.g., incorporating time, speed, and distance corresponding to each member); (vi) social media (e.g., using social media to determine a meet location, such as a familiar location); and/or (vii) a combination of factors. In some embodiments of the present invention, a set of input conditions includes, but is not limited to: (i) a type of meet location (e.g., a coffee shop); and/or (ii) a future destination (e.g., a concert venue). In some embodiments of the present invention, a set of external conditions includes, but is not limited to: (i) weather conditions; (ii) traffic conditions; (iii) ongoing construction; and/or (iv) special events (e.g., an outdoor concert). In this example, update meet location mod 314 updates a meet location for Ann, Betty, and Chris one block further away from a coffee shop. In some embodiments of the present invention, update meet location mod 314 does not update a meet location if an updated meet location is within a predetermined distance of a meet location. In some embodiments of the present invention, update meet location mod 314 updates a meet location responsive to a trigger condition. In some embodiments of the present invention, a trigger condition is an amount of elapsed time. Alternatively, a trigger condition includes, but is not limited to: (i) a predefined time lapse; (ii) a proximity to a geographic point; and/or (iii) a distance variance from a member route.

Processing terminates at operation S290, where update route mod 316 displays an updated set of routes to an updated meet location. In this example, update route mod 316 displays to Ann an updated map including the updated routes for Ann, Betty, and Chris to reach the updated meet location. In some embodiments of the present invention, update route mod 316 displays an updated set of routes to an updated meet location on a map. In some embodiments of the present invention, update route mod 316 displays an updated set of routes in a scale environment. Alternatively, update route mod 316 displays an updated set of routes in a not-to-scale environment. For example, update route mod 316 can display an updated set of routes on a map produced by a transit authority (e.g., a subway map) that is not drawn to scale.

In some embodiments of the present invention, processing does not terminate at operation S290, but processing returns to operation S275, where display route mod 310 displays a set of updated routes. In some embodiments of the present invention, operations S275, S280, S285, and S290 are repeated iteratively (sometimes also called recursively) until a set of members reach a meet location or an updated meet location.

In some embodiments of the present invention, program 300 is a standalone application. In some embodiments of the present invention, program 300 is incorporated into an existing map application. In some embodiments of the present invention, program 300 is incorporated into an existing messaging application.

Figure 4:
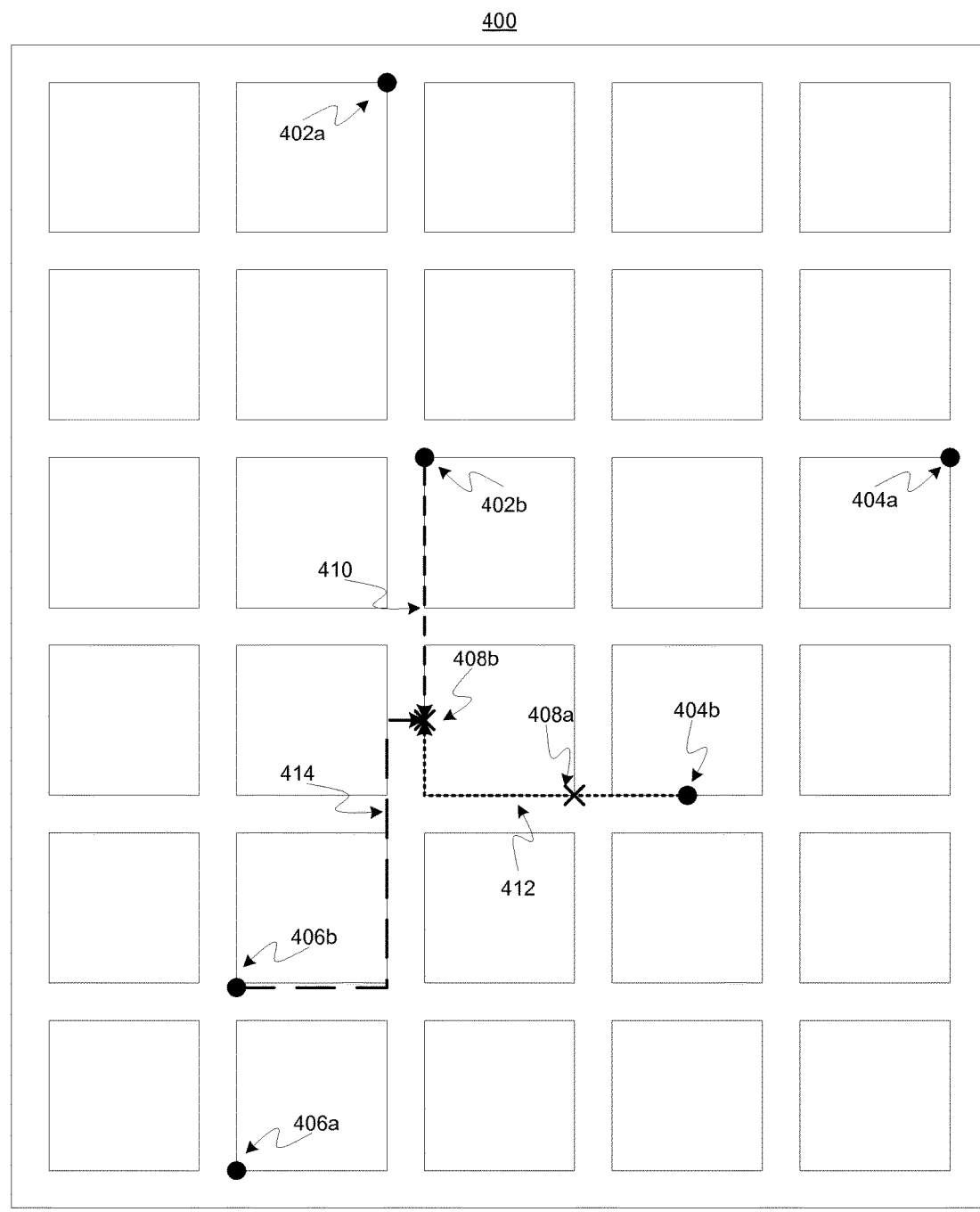
FIG. 4 depicts a screenshot of an adjusted meet location with adjusted routes according to some embodiments of the present invention.

Referring now to FIG. 4, which depicts map 400. Map 400 is an example of a screenshot showing an updated meet location with updated member locations and updated routes. Map 400 includes: first member 402*a*; updated first member 402*b*; second member 404*a*; updated second member 404*b*; third member 406*a*; updated second member 406*b*; meet location 408*a*; updated meet location 408*b*; updated first member route 410; updated second member route 412; and updated third member route 414.

As depicted on map 400, each of the three members was at an initial location (402*a*, 404*a*, and 406*a*, respectively) and each member was traversing a route to an initial meet location (408a). After five minutes (a predetermined refresh condition), the second member had nearly reached the meet location (404b), while the first member was nearly three blocks further away from the meet location (402b). The computer system/server created an updated meet location (408b) based, at least in part, on the updated locations of each member. The computer system/server also created new routes for the set of members. The updated first member route (410) stops at the updated meet location, instead of continuing to the initial meet location. The updated second member route (412) continues past the initial meet location to reach the updated meet location. The updated third member route (414) changes course, bringing the third member around the southeast side of a block, instead of the northwest side of the same block, reducing the number of future turns for the third member.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining a first meet location for a set of members based, at least in part, on a set of input conditions;
   determining a set of current geographic locations respectively corresponding to the set of members;
   generating, responsive to a change in the set of geographic locations, a second meet location for the set of members based, at least in part, on a longest duration for a member in the set of members to reach the first meet location; and
   displaying a set of routes, wherein:
      each route in the set of routes corresponds to a member in the set of members,
      a route in the set of routes starts at a current geographic location in the set of current geographic locations and terminates at the first meet location, and
      the set of routes are determined based, at least in part, on a shortest mean distance time;
   wherein:
      the first meet location is further based, at least in part, on a set of initial geographic locations respectively corresponding to the set of members;
      the set of input conditions includes:
         a set of social media data,
         a future destination, and
         a type of meet location;
      the second meet location is further based, at least in part, on:
         the set of current geographic locations,
         a future destination for the set of members, and
         a set of predicted future rates of speed for the set of members; and
      determining the set of current geographic locations respectively corresponding to the set of members is performed by computer software running on computer hardware.

2. The method of claim 1, wherein the set of routes are further determined based on a set of factors selected from a group consisting of:
   a shortest amount of time;
   a shortest amount of distance; and
   the set of members arriving at the first meet location at one time.

3. The method of claim 1, wherein:
   generating the second meet location for the set of members is performed responsive to a trigger condition.

4. The method of claim 3, wherein the trigger condition is a geographic proximity of a member in the set of members to a predefined location.

5. The method of claim 1, wherein:
   generating the second meet location for the set of members is performed responsive to a predetermined time lapse after determining the first meet location.

6. The method of claim 1, wherein the second meet location is further based, at least in part, on a set of external factors selected from a group consisting of:
   weather conditions;
   traffic conditions;
   ongoing construction; and
   special events.

7. The method of claim 1, wherein the second meet location is further based, at least in part, on a set of predefined member preferences.

8. A computer program product comprising:
   a computer readable storage medium having stored thereon:
      first instructions executable by a device to cause the device to determine a first meet location for a set of members based, at least in part, on a set of input conditions;
      second instructions executable by a device to cause the device to determine a set of current geographic locations respectively corresponding to the set of members;
      third instructions executable by a device to cause the device to generate, responsive to a change in the set of geographic locations, a second meet location for the set of members based, at least in part, on a longest duration for a member in the set of members to reach the first meet location; and
      fourth instructions executable by a device to cause the device to display a set of routes, wherein:
         each route in the set of routes corresponds to a member in the set of members,
         a route in the set of routes starts at a current geographic location in the set of current geographic locations and terminates at the first meet location, and
         the set of routes are determined based, at least in part, on a shortest mean time;
      wherein:
         the first meet location is further based, at least in part, on a set of initial geographic locations respectively corresponding to the set of members;
         the set of input conditions includes:
            a set of social media data,
            a future destination, and
            a type of meet location; and
         the second meet location is further based, at least in part, on:
            the set of current geographic locations,
            a future destination for the set of members, and
            a set of predicted future rates of speed for the set of members.

9. The computer program product of claim 8, wherein:
   fifth instructions executable by a device to cause the device to generate the second meet location for the set of members is performed responsive to a trigger condition.

10. The computer program product of claim 8, wherein:
third instructions to generate the second meet location for the set of members is performed responsive to a predetermined time lapse after determining the first meet location.

11. The computer program product of claim 8, wherein the second meet location is further based, at least in part, on a set of external factors selected from a group consisting of:
weather conditions;
traffic conditions;
ongoing construction; and
special events.

12. The computer program product of claim 8, wherein the second meet location is further based, at least in part, on a set of predefined member preferences.

13. A computer system comprising:
a processor set; and
a computer readable storage medium;
wherein:
the processor set is structured, located, connected, and/or programmed to execute instructions stored on the computer readable storage medium; and
the instructions include:
first instructions executable by a device to cause the device to determine a first meet location for a set of members based, at least in part, on a set of input conditions;
second instructions executable by a device to cause the device to determine a set of current geographic locations respectively corresponding to the set of members;
third instructions executable by a device to cause the device to generate, responsive to a change in the set of geographic locations, a second meet location for the set of members based, at least in part, on a longest duration for a member in the set of members to reach the first meet location; and
fourth instructions executable by a device to cause the device to display a set of routes, wherein:
each route in the set of routes corresponds to a member in the set of members,
a route in the set of routes starts at a current geographic location in the set of current geographic locations and terminates at the first meet location, and
the set of routes are determined based, at least in part, on a shortest mean time;
wherein:
the first meet location is further based, at least in part, on a set of initial geographic locations respectively corresponding to the set of members;
the set of input conditions includes:
a set of social media data,
a future destination, and
a type of meet location; and
the second meet location is further based, at least in part, on:
the set of current geographic locations,
a future destination for the set of members, and
a set of predicted future rates of speed for the set of members.

14. The computer system of claim 13, wherein:
fifth instructions executable by a device to cause the device to generate the second meet location for the set of members is performed responsive to a trigger condition.

15. The computer system of claim 13, wherein:
third instructions to generate the second meet location for the set of members is performed responsive to a predetermined time lapse after determining the first meet location.

16. The computer system of claim 13, wherein the second meet location is further based, at least in part, on a set of external factors selected from a group consisting of:
weather conditions;
traffic conditions;
ongoing construction; and
special events.

17. The computer system of claim 13, wherein the second meet location is further based, at least in part, on a set of predefined member preferences.

* * * * *